United States Patent
Hanson et al.

[11] Patent Number: 5,674,411
[45] Date of Patent: Oct. 7, 1997

[54] METHOD OF WELDING CONTROL ROD TUBE ENDS AND END CAPS

[75] Inventors: George R. Hanson; Lester J. LaSure; Thomas G. Cunningham, all of Wilmington; Richard R. Miller, Rocky Point, all of N.C.

[73] Assignee: General Electric Company, Schenectady, N.Y.

[21] Appl. No.: 617,161

[22] Filed: Mar. 18, 1996

[51] Int. Cl.$^6$ .................................................. B23K 9/12
[52] U.S. Cl. ........................... 219/61; 219/75; 219/125.11
[58] Field of Search ........................... 219/137 R, 72, 219/74, 75, 60 A, 61, 125.11; 228/29, 7

[56] References Cited

U.S. PATENT DOCUMENTS

| | | | |
|---|---|---|---|
| 3,828,518 | 8/1974 | Silk et al. | 219/60 A |
| 3,842,238 | 10/1974 | Boyko et al. | 219/137 R |
| 4,188,521 | 2/1980 | Yeo | 219/72 |
| 4,511,075 | 4/1985 | Yeo | 219/60 A |
| 4,570,051 | 2/1986 | Miwa | 219/137 R |

Primary Examiner—Clifford C. Shaw
Attorney, Agent, or Firm—Nixon & Vanderhye

[57] ABSTRACT

A control rod tube and end plug are disposed in a weld chamber. A fixed welding torch with a tungsten electrode is disposed adjacent the weld area. A collet grips the tube and an inflatable seal seals the weld chamber. By rotating the collet, the tube and end plug are seal-welded to one another without loss of fusion, porosity or suck-back effects. The weld chamber is maintained under a positive pressure of between 5 to 10 psi gauge.

6 Claims, 2 Drawing Sheets

METHOD OF WELDING CONTROL ROD TUBE ENDS AND END CAPS

TECHNICAL FIELD

The present invention relates to a method of welding a tube and end caps for the tube and particularly to a method of welding a control rod tube containing boron carbide powder and end caps for use in a control rod of a nuclear reactor.

BACKGROUND

Control rods for a typical boiling water reactor have a generally elongated cruciform cross-sectional shape for disposition between nuclear fuel bundle assemblies in the reactor core. Typically, the wings of each cruciform-shaped control rod houses a plurality of elongated tubes and which tubes contain boron carbide powder as a neutron-absorbing material. During fabrication, end caps are conventionally welded on the ends of the tubes. These closure welds have traditionally been welded in a mechanically turned device with a gas tungsten arc welding process using mechanized welding having a surface speed of approximately 6 inches per minute under atmospheric pressure. These conventional welding processes, however, have resulted in closure end welds which suffer from porosity, a lack of fusion, "suck-back" and non-uniformity of weld penetration. One or more of these defects may occur. For example, the lack of fusion could occur in one quadrant, whereas other quadrants could have "suck-back" from too high a weld current and have a high porosity. Significant defects of these types have been noted upon X-ray examination of the ends of the end tube and end caps at the welds. The failure rate of the welds has been approximately 40% or more.

In welding the stainless steel end caps and stainless steel tubes, the welds sometimes do not penetrate the material sufficiently such that the material would fuse properly. Also, porosity levels, i.e., gas pockets within the weld, were at an unacceptable level. "Suck-back" has been a particular problem. For example, the inside of the tube, which is back-purged with helium, would at high welding temperatures reach such a temperature that the internal pressure within the tube would blow out the molten metal. Absent a blowout, a more frequent defect was the unacceptably reduced thickness of the metal at the weld. Where a suck-back defect was encountered and detected, it was also virtually impossible to reweld the defective weld by conventional means to overcome that defect. Consequently, in view of the large number of welding defects encountered in welding the tube ends and the end caps to one another, as well as the near impossibility of rewelding certain of those defects, an improved rewelding process is needed to eliminate such defects or enabling rewelding to cure those defects.

DISCLOSURE OF THE INVENTION

According to the present invention, there is provided a welding process which substantially avoids the foregoing noted defects such as suck-back, lack of fusion, porosity and non-uniformity of the welds. To accomplish the foregoing, there is provided a novel and improved welding process according to the present invention wherein each tube end and end cap are welded to one another under pressure and under significantly greater current, as well as at higher speed. For example, the present invention provides a weld chamber in which the tube and end caps may be disposed for welding. The tube is mounted on an air collet for rotation and an inflatable seal is disposed about the tube to seal the opening to the chamber. Within the chamber, there is provided a tungsten arc welder for welding the end cap and tube end to one another. A drive is provided for the tube and end cap so that the junction therebetween can be rotated under the fixed electrode.

Helium under pressure is introduced into the chamber. Consequently, the welding occurs within the chamber with a pressure external to the tube higher than the internal pressure in the tube. This higher external pressure eliminates or minimizes the formation of blowouts through the weld material. For example, a gauge pressure of 5 to 10, preferably 7, psi within the box has been found to be satisfactory for preventing the suck-back defect. Additionally, with a higher weld rate, for example, on the order of 18 inches per minute, higher current input, for example, on the order of 15–30 amps, can be provided.

In a preferred embodiment according to the present invention, there is provided a method of welding an end cap and a control rod tube, comprising the steps of extending a tube into a weld chamber, disposing an end cap on an end of the tube, sealing the weld chamber, relatively displacing a (i) welding rod and (ii) the tube and end cap about an axis and welding the tube and end cap to one another while maintaining a pressure differential between the chamber exterior to the tube end and end cap and the interior of the tube, with the lower pressure being inside the tube.

Accordingly, it is a primary object of the present invention to provide a novel and improved welding process for welding nuclear control rod tube ends to end plugs or caps in a manner which minimizes or eliminates known weld defects such as lack of fusion, porosity and suck-back and is also capable of rewelding previous welds containing such defects.

BEST MODE FOR CARRYING OUT THE INVENTION

Figure 1:
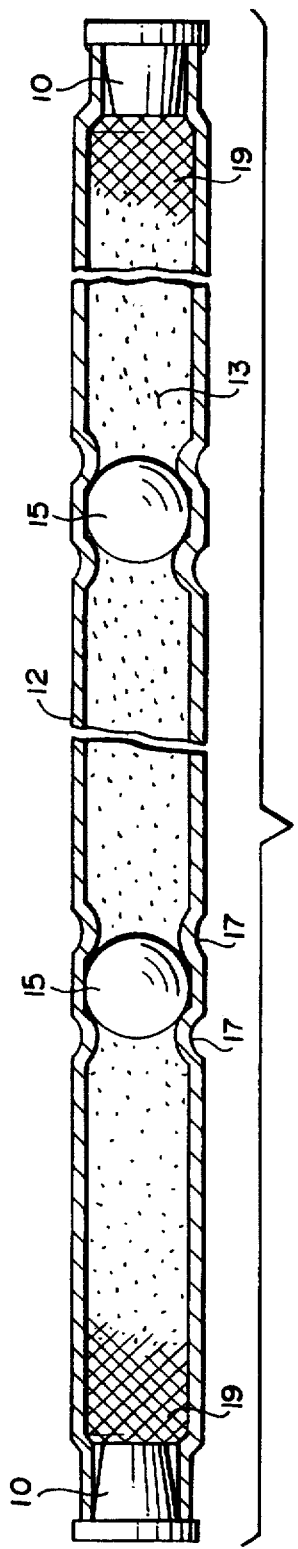
FIG. 1 is a cross-sectional view of a completed control rod tube with portions broken out for clarity.
Figure 2:
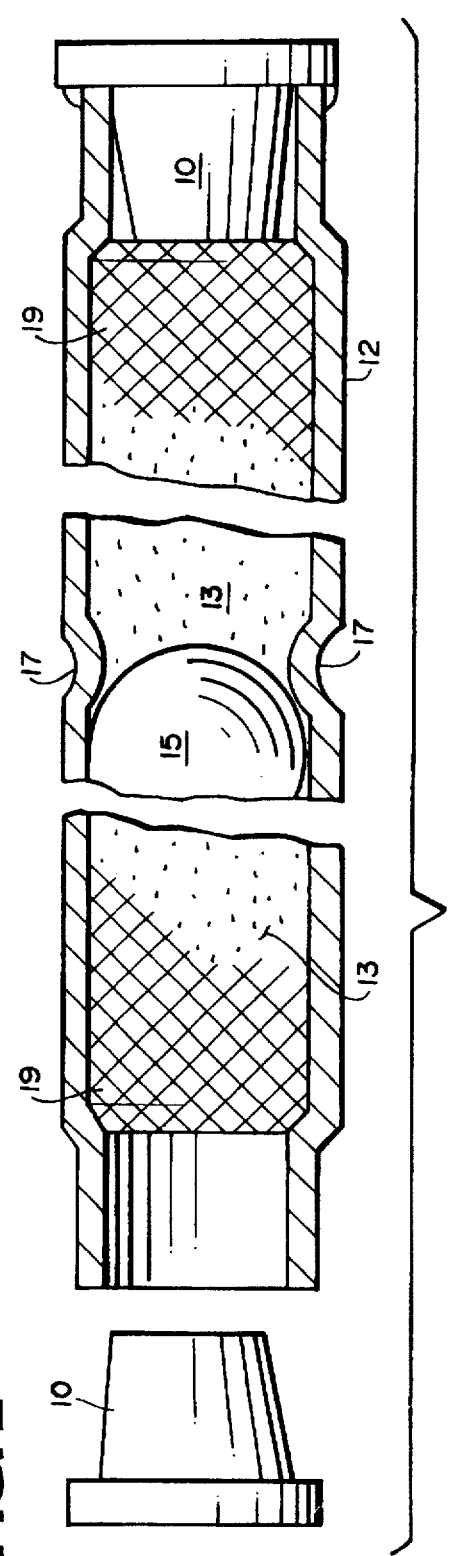
FIG. 2 is a fragmentary enlarged side elevational view of an end plug and an open end of the control rod tube prior to welding to one another and the opposite end of the tube illustrates a welded end plug and tube end.

Referring now to the drawings, particularly to FIG. 1, there are illustrated end plugs 10 for welding to opposite ends of a control rod tube 12. In a typical control rod tube, the tube is filled with a boron carbide powder prior to closing the tube. As illustrated, each end plug 10 includes a flange 14 and a tapered reduced diameter frustoconical section 16 for reception within a reduced or swaged end of the tube 12. The end plug 10 and tube 12 are preferably formed of stainless steel and are welded one to the other in accordance with the welding process of the present invention. Within the control rod tube are segments 13 of boron carbide powder separated from one another along tube 12 by balls 15. The tube is crimped at 17 along opposite sides of each ball to retain the balls and boron carbide powder at designed locations along the tube. At opposite ends of the tube 12 between the end segments 13 of boron carbide powder and the end caps 10 are lengths of a fibrous metal material 19 such as steel wool spacing the boron carbide powder from the end caps.

Figure 3:
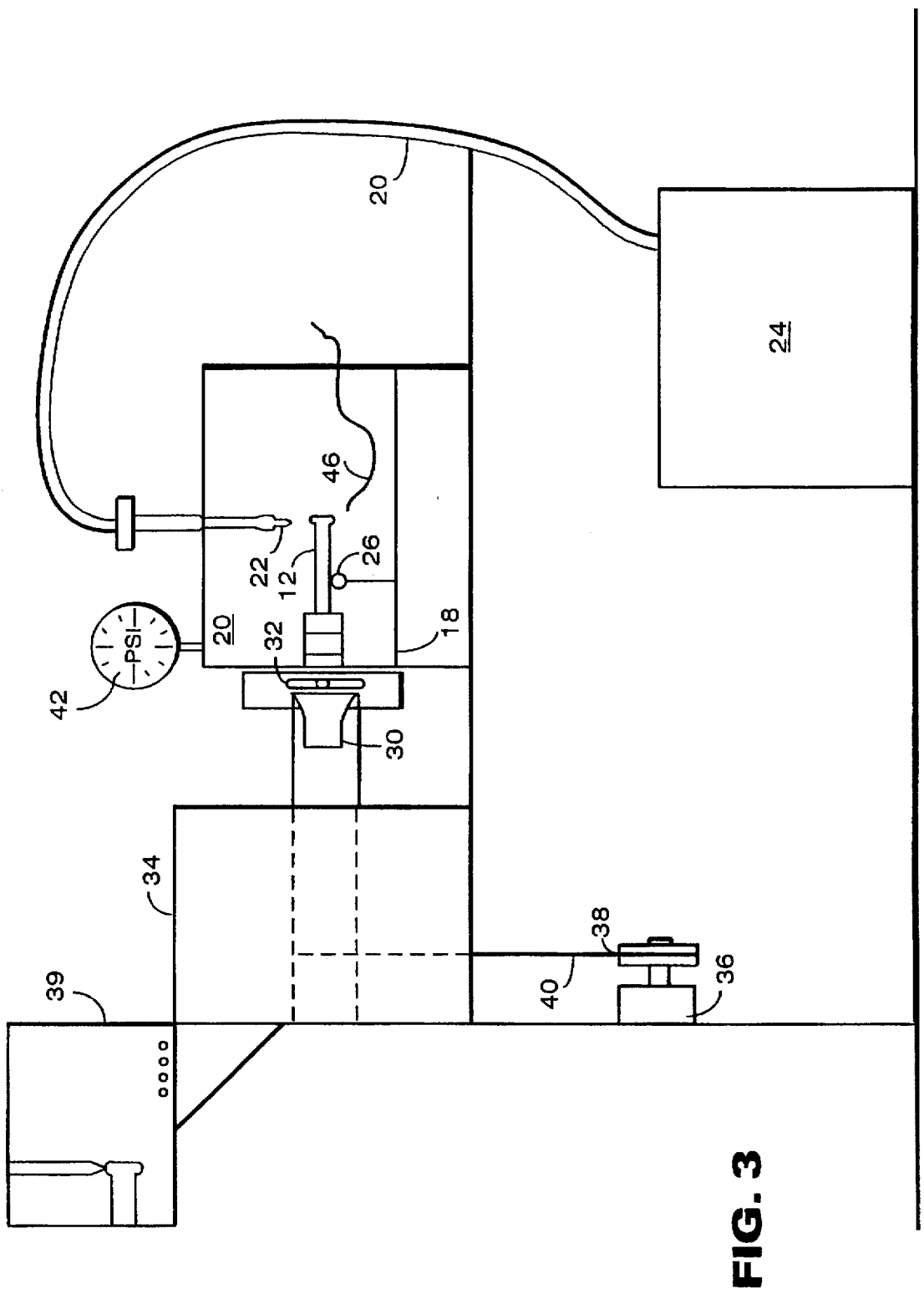
FIG. 3 is a schematic illustration of a weld setup for welding the end plug and tube end to one another.

Referring now to FIG. 3. there is illustrated a welding setup for the tube 12 and end plugs 10. The setup includes a weld box 18 defining a welding chamber 20. A welding torch is fixed inside the weld box 18 and includes a tungsten electrode 22. The welding torch is coupled through suitable connections 20 to a power supply 24. A roller support 26 is also provided within the chamber for supporting the end of the tube.

Outside of the weld box. there is provided an:. air chuck collet 30. also including an inflatable seal 32 for surrounding the tube 12 and the opening through the weld box 18 about tube 12. A drive mechanism 34 is provided for driving the collet 30 and includes a motor 36 having a gear and pulley arrangement 38 and 40. respectively. for rotating the collet 32. A TV monitor 39 is provided for monitoring the setup of the welding torch and the tube and end plug within the weld box 18. as well as the process of welding the end plug and tube end to one another. A pressure gauge 42 is used to ascertain the pressure within the weld chamber 20.

To use the weld setup. an empty tube with the fibrous material disposed at one swaged end of the tube 12. together with an end plug 10 at that end of the tube are inserted manually into the weld box through the collet. The joint between the tube and the end plug are aligned with the welding torch 22. The rod is gripped by the automatic collet 30 and the inflatable seal 32 is inflated to seal the weld chamber 20. A temporary plug is disposed in the opposite end of the tube to seal the tube. The position of the welding electrode and the joint between the tube end and end plug is adjusted. The chamber is then pressurized with the helium gas until an operating pressure of approximately 5 to 10 psi is achieved. Upon reaching the appropriate pressure. preferably about 7 psi. the power supply is activated to ignite an arm and weld the tube end and end plug to one another. Simultaneously. the air chuck collet is rotating the tube and end plug relative to the fixed welding torch at a rotational speed of approximately 30 revolutions per minute. which affords a weld of about 18 inches per minute for a tube diameter of 0.2 inches. It will be appreciated that the pressure within the chamber 20 is higher than the pressure within the tube. This avoids "suck back" defects. A jet 46 of helium gas is provided for flowing helium directly onto the weld to cool the weld. Upon completion of the weld, the chamber is purged and the collet released. The inflatable seal is also deflated. The tube and end plug welded thereto are then removed from the chamber. Note that weld material is not added to the end cap or tube. Rather, the weld is formed by fusing the metal of the tube end and end cap to one another.

With one end of the tube welded closed by the end plug. the tube may now be alternately filled with boron carbide powder and the balls 15. The crimps 17 are formed in the tube after the tube is fully loaded to maintain the balls 15 in appropriate designed positions. The open end of the tube is then filled with the metal fibrous material, i.e., the steel wool. With this, the remaining open end of the tube is closed by inserting the remaining plug into the swaged tube end. The tube and end plug are located within the weld box through the collet to locate the final joint between the tube end and the end plug with the welding torch. The seal 32 is inflated. sealing the chamber. and once again pressurized. the welding commences similarly as previously described with respect to the initially welded end. After welding. the chamber is purged and the collet released. Note that the welds 50 lie within the diametrical confines of the tube because of the swaged end of the tube.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of welding an end cap and a control rod tube, comprising the steps of:

extending a tube into a weld chamber;

disposing an end cap on an end of the tube;

sealing the weld chamber;

relatively displacing a (i) welding rod and (ii) the tube and end cap about an axis;

welding the tube and end cap to one another while maintaining a pressure differential between the chamber exterior to the tube end and end cap and the interior of the tube. with the lower pressure being inside the tube;

flooding the chamber with a helium gas under pressure above atmospheric pressure; and wherein the step of sealing the chamber includes inflating a flexible seal about an opening into said chamber to maintain the chamber at a higher pressure than the interior of the tube.

2. A method according to claim 1 including welding at a speed of about 18 inches per minute.

3. A method according to claim 1 including employing a tungsten arc welder.

4. A method according to claim 1 including welding at an average current of within a range of 15 to 30 amps.

5. A method according to claim 1 including rotating the tube and end cap within the chamber while holding the welder at a fixed location.

6. A method according to claim 1 including welding at a speed of about 18 inches per minute, including employing a tungsten arc welder and welding at an average current of within a range of 15 to 30 amps.

* * * * *